United States Patent

[11] 3,582,755

[72] Inventors: Gote Liss; Ake Ekstrom; Rolf Ljungqvist, all of Ludvika, Sweden
[21] Appl. No. 865,056
[22] Filed Oct. 9, 1969
[45] Patented June 1, 1971
[73] Assignee Allmanna Svenska Elektriska Aktiebolaget Vasteras, Sweden
[32] Priority Oct. 9, 1968
[33] Sweden
[31] 13638

[54] CONTROL SYSTEM FOR CONVERTERS
4 Claims, 6 Drawing Figs.
[52] U.S. Cl. ................................. 321/5, 321/38, 321/40, 321/47
[51] Int. Cl. ................................. H02m 1/08
[50] Field of Search ....................... 321/5, 38, 40, 42, 47

[56] References Cited
UNITED STATES PATENTS
3,434,031  3/1969  Wickliff .................. 321/5
3,445,742  5/1969  Moscardi ................ 321/5X Primary Examiner—William H. Beha, Jr.
Attorney—Jennings Bailey, Jr.

ABSTRACT: A static converter connecting an AC network with a DC line has a control system in which an AC control function voltage is derived from the AC network, while a DC regulator voltage is derived from a regulator. The control system further comprises a first arrangement for deriving the actual time between subsequent following control pulses for the valves of the converter and a second arrangement for deriving a desired value for said time corresponding to the relation between the period time of the AC network and number of pulses of the converter. The difference between said actual time and its desired value is stored in a memory circuit for each valve and as a correction magnitude taken together with the control function voltage and the regulator voltage.

INVENTOR
GÖTE LISS
ÅKE EKSTROM
ROLF LJUNGQVIST

CONTROL SYSTEM FOR CONVERTERS

BACKGROUND OF THE INVENTION

1. Field of the Invention

The present invention relates to a control system for a static converter, which system comprises a control pulse generator, which, depending on its input signal, emits control pulses with a certain delay angle to the valves of the static converter, the input signal consisting of the sum of a DC magnitude from a control amplifier and an AC magnitude in the form of a control function voltage, derived from an AC network connected to the converter. The invention relates to a further development of such a control system to secure symmetrical operation of the valves of the static converter, that is, equidistant ignition of valves, independent of asymmetrics in the AC network connected to the static converter.

2. The Prior Art

Most of the known control systems for static converters are based on generation of the ignition pulse to the valves when the sum of a certain control function voltage and a regulator voltage is equal to zero. Thus the valves will be ignited with a constant delay angle. As the control function voltage usually is generated from the AC voltage in the AC network of the static converter, for instance by phase shifting this voltage 90° the ignition symmetry will be dependent on the symmetry of the AC network and on the symmetry of the phase shifting circuits. The symmetry thus achieved is, however, not satisfactory when there are asymmetries in the AC voltage.

SUMMARY OF THE INVENTION

The present invention relates to a device which, from the actual phase angle of the ignition pulses, forms a correction voltage to be connected in series with the control function voltage, the regulator voltage or the sum of these voltages. By giving this correction voltage a suitable magnitude, an almost complete control symmetry, that is, equidistant ignition, can be obtained. A control system according to the invention will be characterized in that it comprises a first means to measure the actual time between subsequent following control pulses for the valves, a second means to derive a desired value for said time corresponding to the relation between the period time of the AC network of the static converter and the pulse number of the static converter and a means to derive the difference between said actual time and its desired value, a memory circuit for each valve to store said time difference and a switching means to connect said time difference as a correction magnitude to the input side of the control pulse generator.

As the delay of the ignition moment of a valve involves deviations of the ignition intervals between said valve, the previous valve and the following one, connections should be inserted between the memory circuits of the different valves so that the correction magnitude for a valve also influences the ignition moment of the following valve or valves. In such a way it is ensured that the ignition moment only is corrected for that valve for which the ignition moment has been displaced. Further, said correction magnitude should be limited in the upwards direction, considering that large asymmetries may occur in the AC network of the static converter. With great asymmetries in the AC network, equidistant ignition could result in ignition faults, owing to a too early or a too late ignition of a valve. In such a case ignition "phase to phase" with substantially constant delay angle is preferred.

BRIEF DESCRIPTION OF THE DRAWINGS

The invention will be further described with reference to the enclosed drawing, where FIG. 1 shows a circuit diagram for a static converter and its control system, while FIG. 4 shows the symmetry arrangement according to the invention, while

DESCRIPTION OF THE PREFERRED EMBODIMENTS

Figure 1:
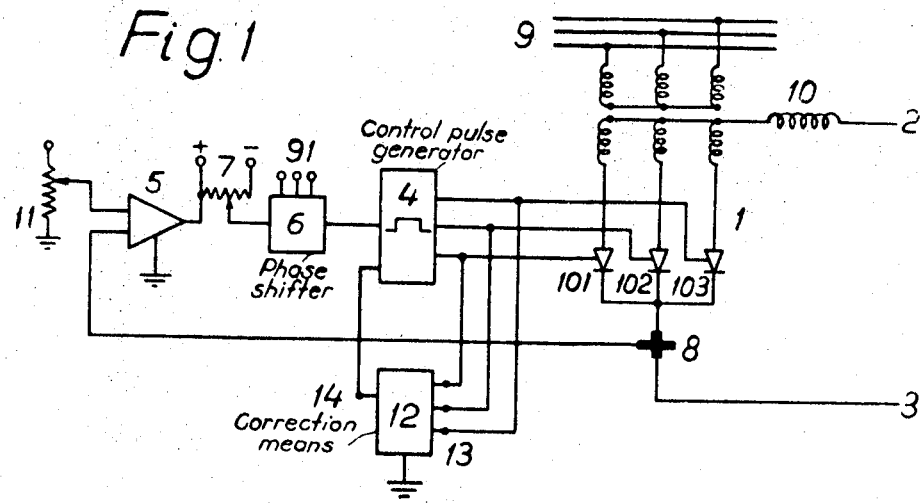

FIG. 1 shows a static converter 1 constructed as a single-way, three-phase static converter, connected to an AC network 9 and to DC bars 2, 3, of which the one DC-bar 2 contains a smoothing reactor 10 and the other bar 3 a measuring transductor 8. The valves 101—103 of the static converter are controlled from the control pulse generator 4 of known design, which emits control pulses with a certain delay angle and usually with rectangular curve shape of the same length as the conducting intervals of the valves, in this case 120°. To the input side of the control pulse generator 4 three voltage sources 5, 6 and 7 are connected—also being of a known design.

The voltage source 5 is a control amplifier to the input side of which is connected a desired value for the DC current of the static converter and also the actual value of the DC current. In this case the desired value is set on a potentiometer 11; it may, however, be derived from a desired value emitter in dependence on another operating magnitude, for instance the desired power of the static converter. The actual value of the direct current is measured by the transductor 8. The output voltage from the amplifier 5 is a DC voltage with constant polarity and a value variable between zero and a maximum value.

The voltage source 6 is a phase shifter connected to the AC network 9 over the terminals 91, and in that way the value of the commutation voltages of the different valves is obtained. By phase shifting these voltages 90°, the control function voltages for the valves are obtained. Thus, the voltage source 6 substantially consists of a phase shifting device to which possibly could be added a filter.

The voltage source 7 is a bias-voltage source, giving a variable DC-voltage, and in FIG. 1 it is simply shown as a potentiometer with the aid of which a certain bias voltage $U_7$ can be set. As will be mentioned later, this bias voltage actually determines the maximum delay angle of the static converter, that is, the delay angle which dictates the commutation margin of the static converter during full AC operation. The voltage source 7 is therefore normally constructed as a so called commutation margin device, for instance according to the U.S. Pat. No. 2.774.012, which device in dependence on the actual commutation voltage and the DC voltage of the static converter calculates a control voltage corresponding to the normally permitted maximum delay angle. The components 1—11 thus indicate a quite conventional static converter with a known control system, the function of which is seen from FIG. 2.

Figure 2:
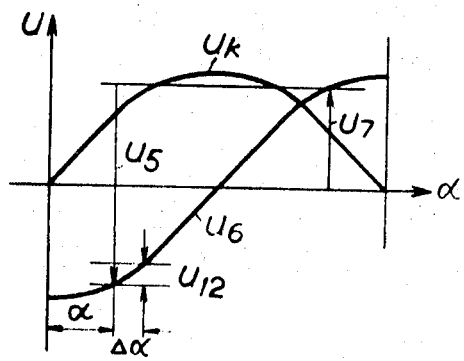
FIG. 2 shows a diagram of the voltages in the control system.

In FIG. 2, where the abscissa indicates the phase angle, while the ordinate indicates the voltage, a half period is shown of a commutation voltage $U_K$ for a valve. From this is derived a control function voltage $U_6$ in the member 6 by shifting the phase 90°. Further, in FIG. 2 is shown the bias voltage $U_7$ and the output voltage $U_5$ from the regulating amplifier 5, which two voltages are DC voltages and counterdirected to each other. When the sum of these three voltages $U_5$, $U_6$ and $U_7$ passes zero, that is, at the delay angle, $\alpha$, the control pulse generator emits its control pulse, and it is seen that maximum output voltage from the regulating amplifier 5 gives a minimum delay angle $\alpha$, that is, full DC operation, while the output voltage zero from the regulating amplifier gives a maximum delay angle $\alpha$, that is, full AC operation. It is also seen that the maximum delay angle $\alpha$ is indicated by the bias voltage $U_7$.

FIG. 2 is the same for all three valves, but with 120° phase delay between the corresponding control function voltages $U_6$. As long as this phase delay is exactly 120° for all three valves and the control function voltages have the same curve shape and size, the delay angles $\alpha$ also remain equal, and thus a quite symmetric operation of the static converter is obtained with equidistant ignition of the valves.

With differences in the control function voltages the symmetry, however, is lost. Such differences may depend on harmonics or disturbances in the network 9, or they may quite simply be due to differences in the phase shifting circuits of the member 6, with the result that the control function voltages $U_6$ are not exactly 120° phase delayed.

To eliminate this, the member 12 has been inserted, according to the invention, in series with the components 5—7 on the input side of the control pulse generator 4. The input side of the member 12 is connected to the output side of the control pulse generator 4 over terminals 13.

The member 12 contains a desired value emitter to indicate the period time T of the network 9, divided by the pulse number $p$ of the static converter—in this case three. Further, the member 12 contains a means to measure the intervals between consecutively following ignitions of the valves and a means to compare these intervals with the desired value $T{:}p$. The differences between the actual values and the desired ones of these intervals are determined in the member 12, and, by integrating the measured differences for each valve, correction magnitudes $U_{12}$ are formed, which in proper sequence are connected in series with the input voltages $U_5$—$U_7$ for the control pulse generator 4. Thus, the voltage $U_{12}$ will result in a correction $\Delta$, $\alpha$ of the delay angle $\alpha$, as is shown in FIG. 2.

Figure 3:
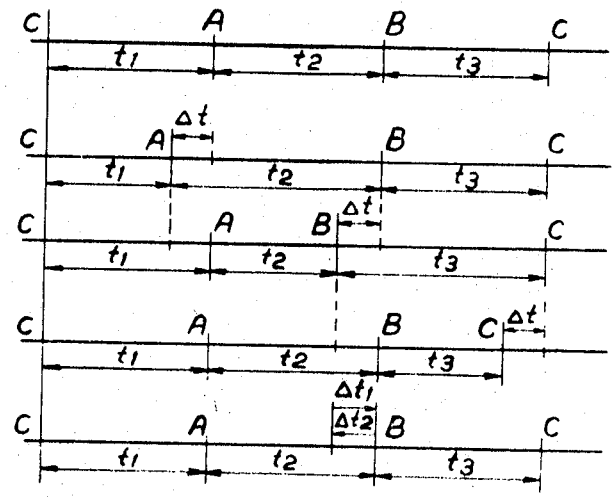
FIG. 3 shows a diagram of the ignition moments for the valves for symmetrical as well as for asymmetrical ignition and also the influence of a correction according to the invention.

The condition has been indicated in FIG. 3, where $a$—$e$ show different cases. The points A—C indicate the ignition moments for the three valves of the static converter. The case $a$ shows equidistant ignition, where the intervals $t1$—$t3$ are constantly equal to $T{:}p$. The output voltage $U_{12}$ from the member 12 will therefore be zero.

As to the case $b$ the ignition moment A is too by the time $\Delta t$ and therefore the time $t1$ becomes too short and the time $t2$ too long. The time $\Delta t$ is stored in the member 12 and during the next ignition cycle it will result in a correction magnitude, where the time $t1$ is prolonged so that the ignition moment A occurs at the right moment, as shown in the case $c$. However, the time $t2$, which in the case $b$ was too long, will be shortened, and therefore the moment B is too early in the case $c$. Now the time $t2$ becomes too short and $t3$ too long, which results in a new correction so that in the case $d$ the moment B occurs at the right moment, while the moment C is too early. Thus, it is seen that the fault is transferred from one ignition cycle to the next.

This is applicable, provided the correction always is as great as the measured fault. If, however, the correction is made less than the fault, the fault will still be transferred from one ignition cycle to the next, but with constantly decreasing size, since the correction magnitudes are formed by integration of the measured deviations. Thus, a smoothing filter effect is obtained in the correction, but simultaneously it will also require a rather long equalization time and result in unfavorable dynamic properties of the device.

Another way to avoid the transfer of the fault is to feed the correction magnitude not only to the control circuit of the actual valve but also to the following valve, as shown in FIG. 3e. The correction $\Delta t$, obtained from the case $b$ for the time $t1$, is inserted for $t1$ as well as for $t2$. Thus, the time $t2$ is corrected with its own correction $\Delta t2$ and with $\Delta t1$ from $t1$, where $\Delta t1$ and $\Delta t2$ are equal in magnitude but opposite in sign, thus leaving the moment B, which already was right, unchanged.

Figure 4:
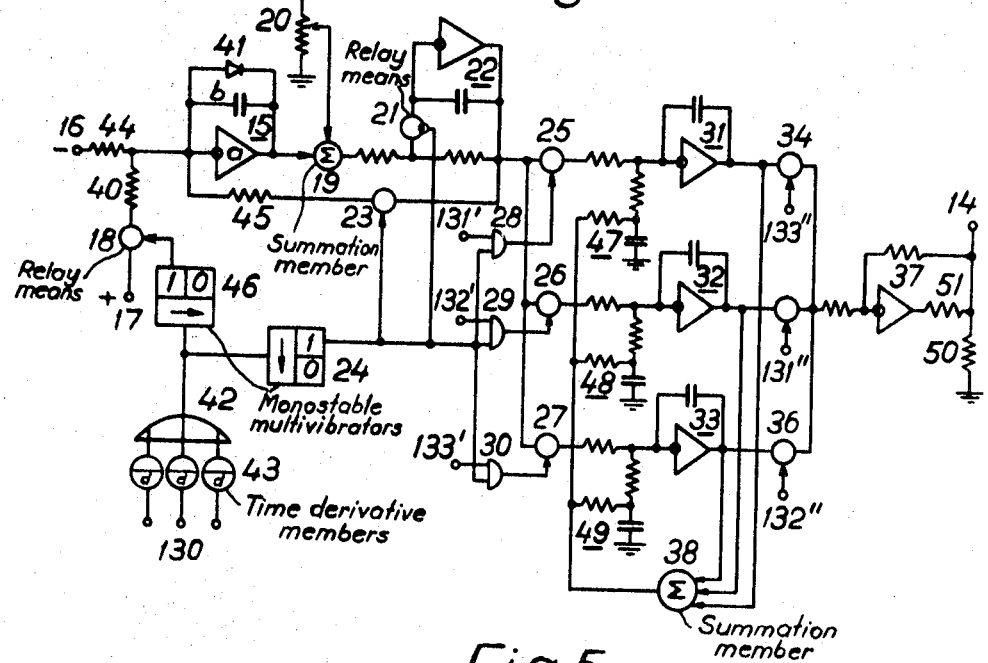

Both these possibilities are suitably combined, as seen from FIG. 4, showing the member 12 more in detail. This member is built-up of a number of amplifiers, connected together with different types of electronic switching members, which components are generally known and used. They are therefore only symbolically shown and they are described with reference to their function.

The first amplifier, the input amplifier 15, contains two components, the amplifier $a$. and a feedback capacitor $b$. A negative input voltage has been connected to the terminal 16 over an input resistance 44. The amplifier 15 works as an integrating member in such a way that during a negative input voltage it emits a positive output voltage corresponding to the integral of the input voltage.

Figure 5:
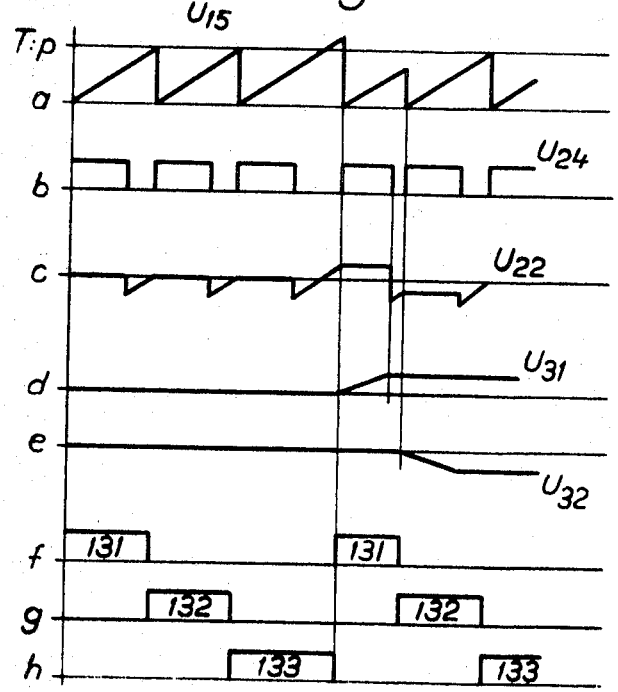
FIG. 5 shows the voltage curves for this.

The input of the amplifier 15 is further provided with a cancelling device, consisting of a positive voltage source at the terminal 17 and an electronic relay means 18 operated by an OR-gate 42 through a monostable multivibrator 46. The gate 42 has three input terminals 130, connected to the input terminals 13 of the member 12, which, in turn, are connected to the output side of the control pulse generator 4, see FIG. 1. The control pulses from the control pulse generator are connected to the OR-gate 42 over time derivative members 43, for instance, series capacitors. Said control pulses are indicated in FIG. 5$f$—$h$, denoted 131—133.

Thus, at the beginning of each control pulse, that is, at the ignition of each valve, the monostable multivibrator 46 emits a short signal and at the same time the member 18, having the character of a make contact relay, for a short moment becomes conducting. Thus the relatively great positive voltage 17 will dominate all other inputs of the amplifier 15. Owing to the diode 41 the amplifier 15 will be short circuited during positive input voltage, and thus its capacitor voltage becomes zero. When, shortly afterwards, the member 18 is interrupted, the negative constant voltage at 16 will cause the output voltage of 15 to increase with constant speed. The output voltage $U_{15}$ from the amplifier 15 has been shown in FIG. 5$a$. It consists of a saw tooth voltage having a certain inclination of the teeth and at each moment the value of the voltage will correspond to the time since the latest cancelling, that is, the latest valve ignition in the static converter. With equidistant ignition the amplitude becomes equal with the period time T of the network 9, divided by the pulse number $p$. When displacements of ignition occur, the amplitude, however, will exceed or be less than the value $T{:}p$, as indicated at the third and fourth ignition intervals.

The output from 15 has been connected to a summation member 19 to which also has been connected a desired value emitter in the form of a potentiometer 20, connected to a negative voltage source. A voltage has been set on the potentiometer 20, corresponding to the time $T{:}p$, that is, the period time T corresponding to the rated frequency of the network 9 divided by $p$. This period time could also be measured constantly so that an exact measure is obtained even in case of frequency variations in the network 9. However, as will be explained later, such frequency variations can be compensated in a simpler way. The output from the member 19, which is connected to the input of the next amplifier 22 over a relay means 21, will always indicate the difference between the time since the previous ignition and the desired value $T{:}p$. The curve shape of this output signal will therefore be the same as the one of $U_{15}$ in FIG. 5$a$, but with a zero line at the ordinate $T{:}p$.

The relay means 21 has the character of a breaking relay, that is, it is conducting at the control signal 0 and is interrupted at the control signal 1. This member is operated by a monostable multivibrator 24, which, in turn, is controlled from the output signal of the gate 42. At each ignition of a valve, the gate 42 emits a signal to the multivibrator 24, which then gives a signal of a certain duration. The signal from the multivibrator 24 is shown in FIG. 5$b$ and consists of a sequence of rectangular pulses, the duration of which amounts to a certain fraction of the ignition intervals.

Thus, the signals from 24 will break the connection between the summation member 19 and the amplifier 22 by means of the member 21. When the signal from 24 is zero, the amplifier will follow the output signal from 19, and this following function should be good and have a small time constant. However, when 24 emits an output signal, the amplifier 22 will be disconnected from 19, and thus the amplifier in its feedback capacitor will retain the output signal from 19 at the end of the ignition interval, that is, the signal corresponding to the difference between the actual value of the ignition interval and the desired value. The output signal $U_{22}$ of the amplifier 22 is shown in FIG. 5$c$, and it is seen that this is zero at the end of each of the first two periods of $U_{15}$ in FIG. 5$a$ (second and third period in FIG. 5$c$). After the third period of $U_{15}$, $U_{22}$ becomes positive (the fourth period in FIG. 5$c$) and after the fourth period of $U_{15}$, $U_{22}$ becomes negative (the fifth period in FIG. 5c). Thus, the output voltage $U_{22}$ contains "period to period" the possible deviation of the previous ignition interval from its desired value corresponding to equidistant ignition. For each ignition interval these deviations should be stored to the next period of the voltage in the network 9 in FIG. 1, to be inserted then as corrections to the input side of the control pulse generator 4 over the terminal 14 for corresponding ignitions during this period. This storage is made in memory circuits in the form of amplifiers 31—33, which are successively connected to the amplifier 22 by means of the relay means 25—27 having the character of make contact relays controlled by AND-gates 28—30.

Each of said AND-gates 28—30 have two inputs, namely a first input connected to the multivibrator 24 and a second input 131'—133', connected to the corresponding terminal 13 from the control pulse generator 4. Thus, the signals from the amplifier 22 are transmitted to the amplifiers 31—33 respectively, synchronously with the control pulses 131—133 in FIG. 5f—h. Over relay means 34—36, also controlled from the pulses 131—133, the signals are then successively transmitted to the output amplifier 37, from the output terminal 14 of which the corrections are transmitted to the input of the control pulse generator 4. Thus the sequence will be as follows:

During the conducting interval 133 of the valve 103, see FIG. 5h, the time deviation $U_{15}$ is measured continuously in the summation member 19. During the latter part of this conducting interval, that is, when the signal $U_{24}$ ceases, the deviation is transmitted to the amplifier 22 and the final deviation $U_{22}$ is stored there at the beginning of the conducting interval 131 of the valve 101, see FIG. 5f. During the first part of this conducting interval, that is, when the multivibrator 24 emits an output signal, the gate 28 emits a signal to the relay means 25, so that the signal from 22 is transmitted to the amplifier 31, which acts as an integrator for the signal from 22, see FIG. 5d. By adjustment of the input resistances and feedback capacitors of the amplifiers 31—33 and the pulse length of the multivibrator 24 is decided how great a fraction of the real time deviation, stored in 22, is during a recording interval, to be transmitted to the memory circuits as a correction magnitude. By this method it is decided how rapidly or thoroughly the correction should be made. With a certain asymmetry the corresponding corrections will be stored in the amplifiers 31—33 and their feedback capacitors after which the fault signal from the amplifier 22 ceases as long as no changes occur. Thus, owing to the integrating effect of the amplifiers 31—33 constant and sufficient correction magnitudes are obtained from amplifiers at constant dissymmetry.

During the next conducting interval 133 of the valve 103, see FIG. 5h, the amplifier 31 is connected to the output amplifier 37 by means of the relay means 34, controlled by the control pulse 133, connected to the input terminal 133''. At the end of the conducting interval 133, the correction is thus connected over the terminal 14. As a result of this the ignition of the next valve 101 is accelerated and the conducting interval 133, which was too long, is more or less shortened depending on how great the correction is that has been transmitted through the amplifier 31.

As the conducting interval 131 was too short, a corresponding correction is stored in the amplifier 32, which will delay the ignition of the valve 102. However, this is wrong, as the shortening of the conducting interval 131 did not depend on too early ignition of the valve 102, but on too late ignition of the valve 101. This fault is, however, neutralized by a feedback of the signal from 22 to the input of the amplifier 15.

This feedback occurs over a relay means 23, with the character of a make contact relay, and controlled by pulses from the multivibrator 24, and a feedback resistance 45 so chosen that the correction in 22 through the amplifier 15 influences 22 with its full value. In such a way the fault in one phase is prevented from being periodically transferred from "phase to phase" according to the explanation of FIG. 3.

It is clear that the sum of the corrections for the three control pulses constantly must be zero, as a positive or negative sum correction, however small it might be, involves a displacement of the control pulses in the one or the other direction. Certainly such a tendency is compensated by the regulating amplifier 5, if the static converter is current controlled as a changed control position of the valves influences the DC current of the static converter and thus the signal from the measuring transductor 8. However, as a matter of fact, it is always desirable that a fault is tackled at the fault-source, if possible.

For this reason the signals from the amplifiers 31—33 are connected to a summation member 38, the output signal of which is fed back to the inputs of the amplifiers 31—33 over smoothing devices 47—49, each comprising two series resistors and a shunt capacitor between them. In such a way a positive or negative sum correction will be inserted as a common correction for all the three amplifiers, thus forcing the summing correction down to zero.

In the same way frequency deviations in the network 9, which give rise to a summing correction deviating from zero will be compensated so that it is permissible to start with a fixed rated frequency, the period time of which is known from the setting of the potentiometer 20.

As previously mentioned, the numerical value of the correction should be limited in the upward direction. A too great correction, which possibly could be caused by faults in the circuits, may cause such a great displacement of the control pulses in the one direction or the other that ignition faults occur and, further, such a great displacement may give rise to harmonics which are more troublesome than those causing the asymmetry.

Such a limitation of the output signal of the amplifier 37 is achieved, according to FIG. 4, by connecting the output terminal 14 to the voltage divider 50, 51 on the output side of 37.

The output voltage of the amplifier 37 has a certain saturation value, the magnitude of which can be fixed by the performance and dimensioning of the amplifier and its feedback circuit and when this saturation value has been set it is possible, by choosing the resistors 50 and 51, to fix the saturation value on the terminal 14 as a fraction of the output voltage of the amplifier. In such a way the voltage on the terminal 14 can never exceed said fraction of the saturation voltage from the amplifier.

The summation members 19 and 38 are simply parallel or series connecting means depending on whether their input signals have the character of currents or voltages.

Figure 6:
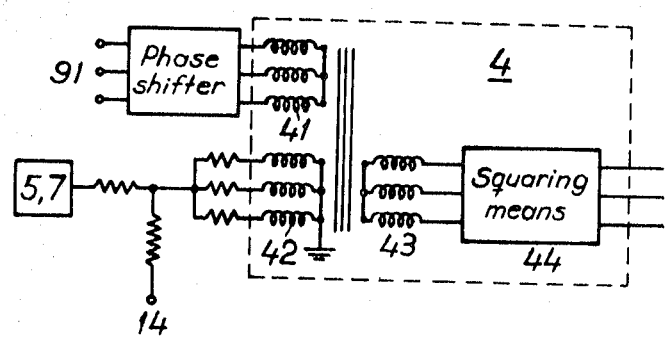
FIG. 6 shows a detail of FIG. 1.

In FIG. 6 is shown in more detail the control pulse generator 4 and its connections on the input side. The generator 4 is here shown as a three-phase transformer, for instance a pulse transformer, with a primary winding 41, a bias winding 42 and a secondary winding 43. The primary winding 41 is fed from the network 9 over the terminals 91 and the phase shifter 6 so that the voltages influencing the phase windings of 41 are like $U_6$ of FIG. 2.

The bias winding 42 is influenced from the output from 7, which is in series with the control amplifier 5. To the input of 42 is also connected the terminal 14 from FIG. 4 so that the correction term is connected to the bias winding. It is seen that the phases of bias winding 42 are influenced from a direct current source and this is why 42 is called a bias winding.

When the alternating excitation of a phase of winding 41 passes the excitation of the corresponding phase of 42, a voltage pulse will be induced in the corresponding phase of the secondary winding 43. As seen from FIG. 5, f—h, it is desirable to have rectangular pulses from 4 for the control of the valves so that some kind of squaring means 44 is suitably inserted on the output side of 4.

FIG. 6 should only be seen as an example on how the pulse generator 4 could be made in principle.

We claim:

1. Control system for a static converter comprising a control pulse generator which in dependence of its input signal delivers control pulses with a certain delay angle to the valves of the converter, said input signal consisting essentially of the sum of a DC magnitude from a control amplifier and an AC magnitude in the form of a control function voltage derived from an AC network connected to the converter, in which the control system further comprises a first means for measuring the intervals between consecutive control pulses for the valves, a second means for deriving a desired value for said intervals corresponding to the relation between the period time for said AC network and the pulse number of the converter and a third means connected to said first and second means for deriving the difference between the actual and the desired value of said intervals, a memory circuit for each valve connected to said third means for storing said time difference, and connecting means for supplying said time difference as a correction magnitude to the input side of the control pulse generator.

2. Control system according to claim 1, further comprising feedback circuit means connecting the memory circuits of the different valves for transmitting the correction magnitude for one valve to influence the following valves.

3. Control system according to claim 1, in which said third means comprises a summation member for summation of all the correction magnitudes, the output from this member being connected to the input of said memory circuits.

4. Control system according to claim 1, further including a limiting means for said correction magnitudes for limiting the correction at great disymmetries.